(12) United States Patent
Jo et al.

(10) Patent No.: US 11,994,935 B2
(45) Date of Patent: May 28, 2024

(54) APPARATUS AND METHOD FOR PREDICTING REMAINING LIFETIME OF ENVIRONMENT DATA COLLECTION SENSOR IN LIVESTOCK HOUSE

(71) Applicant: ELECTRONICS AND TELECOMMUNICATIONS RESEARCH INSTITUTE, Daejeon (KR)

(72) Inventors: Seng Kyoun Jo, Daejeon (KR); Se Han Kim, Daejeon (KR); You Jin Kim, Daejeon (KR); Dae Heon Park, Daejeon (KR); Hyeon Park, Daejeon (KR); Jee Sook Eun, Daejeon (KR); Jae Young Jung, Daejeon (KR); Won Kyu Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 150 days.

(21) Appl. No.: 17/669,124

(22) Filed: Feb. 10, 2022

(65) Prior Publication Data
US 2022/0253350 A1 Aug. 11, 2022

(30) Foreign Application Priority Data
Feb. 10, 2021 (KR) .................. 10-2021-0019172

(51) Int. Cl.
*G06F 11/07* (2006.01)
*G06N 3/044* (2023.01)
(Continued)

(52) U.S. Cl.
CPC ...... *G06F 11/0757* (2013.01); *G06F 11/0736* (2013.01); *G06N 3/044* (2023.01); *G06N 3/08* (2013.01); *G06Q 50/02* (2013.01)

(58) Field of Classification Search
CPC .................. G06F 11/0757; G06F 11/0736
See application file for complete search history.

(56) References Cited

U.S. PATENT DOCUMENTS

| 11,734,097 B1* | 8/2023 | Golden .............. G06N 20/00 714/47.2 |
| 2016/0120144 A1* | 5/2016 | Kim .................... A01K 1/0052 119/436 |

(Continued)

FOREIGN PATENT DOCUMENTS

| JP | 6182052 B | 8/2017 |
| KR | 101259443 B | 4/2013 |
| KR | 101725659 B | 4/2017 |

*Primary Examiner* — Matthew M Kim
*Assistant Examiner* — Kyle Emanuele

(57) ABSTRACT

Provided is an apparatus and method for predicting the remaining lifetime of an environment data collection sensor in a livestock house. The method for predicting the remaining lifetime of an environment data collection sensor in a livestock house includes (a) collecting livestock house environment information, (b) detecting an error of a sensor from the collected livestock house environment information, (c) generating a dataset for learning, (d) generating a sensor lifetime prediction model to performing learning, and (e) predicting a lifetime of the sensor using a result of the learning.

9 Claims, 11 Drawing Sheets

(51) Int. Cl.
*G06N 3/08* (2023.01)
*G06Q 50/02* (2012.01)

(56) References Cited

U.S. PATENT DOCUMENTS

2018/0129726 A1    5/2018    Park et al.
2020/0293392 A1*  9/2020    Alves ................... G06F 16/2379
2022/0101270 A1*  3/2022    Tenneti ............... G06F 11/0751

* cited by examiner

FIG. 4

| TIME | TEMPERATURE | HUMIDITY | AMMONIA | CARBON DIOXIDE | FEEDING | WEIGHT | EXHAUST FAN POWER |
|---|---|---|---|---|---|---|---|
| 10:00 | 25°C | 60% | 15ppm | 3,500ppm | 15.0kg | — | 20% |
| 11:00 | 26°C | 55% | 18ppm | 3,550ppm | 14.7kg | — | 50% |
| ... | ... | ... | ... | ... | ... | ... | ... |
| 23:00 | 25°C | 60% | 10ppm | 2,500ppm | 6.2kg | — | 50% |
| ... | ... | ... | ... | ... | ... | ... | ... |

FIG. 7

| TIMESTAMP | TIME | TEMPERATURE | HUMIDITY | AMMONIA | CARBON DIOXIDE | EXHAUST FAN POWER | FEEDING EFFICIENCY | REMAINING LIFETIME |
|---|---|---|---|---|---|---|---|---|
| 1 | $T_{setup}$ | 25°C | 60% | 15ppm | 3,500ppm | 20% | 2.3 | N-1 |
| 2 | ... | 26°C | 55% | 18ppm | 3,550ppm | 30% | 2.3 | N-2 |
| ... | ... | ... | ... | ... | ... | ... | 2.3 | ... |
| ... | ... | 25°C | 60% | 10ppm | 2,500ppm | 50% | 2.3 | ... |
| N | $T_{error}$ | ... | ... | ... | ... | ... | 2.3 | 0 |

FIG. 9

| TIMESTAMP | TIME | TEMPERATURE | HUMIDITY | AMMONIA | CARBON DIOXIDE | EXHAUST FAN POWER | FEEDING EFFICIENCY |
|---|---|---|---|---|---|---|---|
| 1 | $T_{setup}$ | 25°C | 60% | 15ppm | 3,500ppm | 20% | 2.3 |
| 2 | ... | 26°C | 55% | 18ppm | 3,550ppm | 30% | 2.3 |
| ... | ... | ... | ... | ... | ... | ... | 2.3 |
| ... | $T_{measurs}$ | 25°C | 60% | 10ppm | 2,500ppm | 50% | 2.3 |

APPARATUS AND METHOD FOR PREDICTING REMAINING LIFETIME OF ENVIRONMENT DATA COLLECTION SENSOR IN LIVESTOCK HOUSE

CROSS-REFERENCE TO RELATED APPLICATION

This application claims priority to and the benefit of Korean Patent Application No. 10-2021-0019172, filed on Feb. 10, 2021, the disclosure of which is incorporated herein by reference in its entirety.

BACKGROUND

1. Field of the Invention

The present invention relates to an apparatus and method for predicting the remaining lifetime of an environment data collection sensor in a livestock house.

2. Discussion of Related Art

In order to provide a pleasant breeding environment, various sensors are installed in a livestock house and monitoring information regarding environment information of the livestock house is provided in real time such that the monitoring information is used for management of various specifications.

However, poor environments, such as gas and dust, in livestock houses decrease the durability of the installed sensors, causing the sensors to have frequent failures, shortened lifetimes, and data errors, so there is a difficulty in collecting environment data in a stable manner.

SUMMARY OF THE INVENTION

The present invention has been proposed to solve the above-described problem and is directed to providing an apparatus and method capable of predicting the remaining lifetime of a sensor installed in a livestock house, to respond in advance to malfunctions and failures of the sensor that may occur in a poor environment while continuously monitoring the livestock house environment and stably securing environment data.

The technical objectives of the present invention are not limited to the above, and other objectives may become apparent to those of ordinary skill in the art based on the following description.

According to an aspect of the present invention, there is provided a method of predicting a remaining lifetime of an environment data collection sensor in a livestock house, the method including the steps of (a) collecting livestock house environment information, (b) detecting an error of a sensor from the collected livestock house environment information, (c) generating a dataset for learning, (d) generating a sensor lifetime prediction model to perform learning, and (e) predicting a lifetime of the sensor using a result of the learning.

The step (b) may include monitoring the livestock house environment information to identify whether a malfunction of the sensor occurs or whether a sensing value of the sensor is normal so as to detect the error.

The step (c) may include analyzing feed efficiency over a preset period of time and generating the dataset.

The step (d) may include specifying characteristics of the livestock house environment information including a temperature, a humidity, ammonia, carbon dioxide, exhaust fan power, feed efficiency, and a remaining lifetime, and generating the sensor lifetime prediction model using a time series-based long short term memory (LSTM) cell.

According to an aspect of the present invention, there is provided an apparatus for predicting a remaining lifetime of an environment data collection sensor in a livestock house, the apparatus including: an inputter configured to collect environment information of an inside of a livestock house; a memory in which a program for predicting a remaining lifetime of a sensor using the environment information of the inside of the livestock house is stored; and a processor configured to execute the program, wherein the processor may be configured to, using the environment information of the inside of the livestock house, detect an error of the sensor, generate a dataset for learning, and generate a sensor lifetime prediction model to perform learning, and using a result of the learning, predict a lifetime of the sensor.

The inputter may be configured to periodically collect the environment information of the inside of the livestock house from the sensor installed in the livestock house through a wired/wireless communication interface.

The processor may be configured to monitor a sensing value to identify whether a malfunction of the sensor occurs or whether the sensing value is normal, so that the error is detected.

The processor may be configured to analyze feed efficiency over a preset period of time and generate the dataset.

The processor may be configured to specify characteristics of the environment information of the inside of the livestock house including a temperature, a humidity, ammonia, carbon dioxide, exhaust fan power, feed efficiency, and a remaining lifetime, and generate the sensor lifetime prediction model using a time series-based long short term memory (LSTM) cell.

The processor may be configured to perform a pre-processing process for performing the modeling and learning, in which information required for analysis is retrieved using information about a point in time at which the error of the sensor is detected since a point in time at which the sensor is installed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4 illustrates a schema of a database for storing data collected from various sensors installed in a livestock house according to an embodiment of the present invention;

FIG. 7 illustrates a schema regarding a dataset required for learning according to an embodiment of the present invention;

FIG. 9 illustrates a data schema regarding a dataset to be used as an input for predicting the remaining lifetime of an ammonia sensor according to an embodiment of the present invention;

DETAILED DESCRIPTION OF EXEMPLARY EMBODIMENTS

Figure 1:
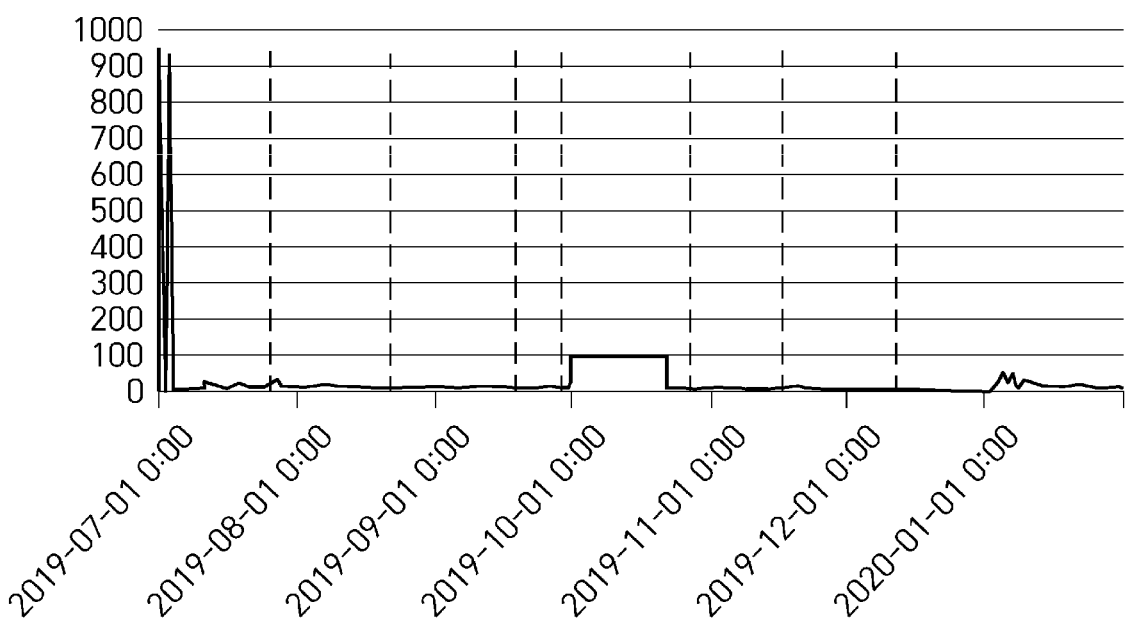
FIG. 1 illustrates data collected by an ammonia measurement sensor.

Hereinafter, the above and other objectives, advantages, and features of the present invention and ways of achieving them will become readily apparent with reference to descriptions of the following detailed embodiments in conjunction with the accompanying drawings.

However, the present invention is not limited to embodiments to be described below and may be embodied in various forms. The embodiments to be described below are provided only to assist those skilled in the art in fully understanding the objectives, configurations, and the effects of the invention, and the scope of the present invention is defined only by the appended claims.

Meanwhile, terms used herein are used to aid in the explanation and understanding of the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Before describing the embodiments of the present invention, the background for proposing the present invention will be described first for the sake of understanding for those skilled in the art.

In the agricultural field, with the active use of information and communications technology (ICT), the convenience and productivity of agriculture are improved at the same time, and a large number of farms are attempting to introduce ICT.

In recent years, as various ICT technologies are applied to livestock houses, many changes are occurring in livestock breeding.

In other words, even in the livestock industry, the use of ICT technology may enable precise control of the environment of livestock houses and of the management of livestock health regardless of time and place.

For example, the breeding management of the past was performed by humans directly feeding livestock and visually checking the state of livestock, while the breeding management of today is performed by automation through introduction of IoT using various sensors/devices, so that many conveniences in the livestock industry are provided.

The biggest factor that brought about this change in the livestock industry was because a more pleasant breeding environment is provided by being able to monitor and analyze the environment of a livestock house on the basis of data (the temperature, the humidity, the ammonia concentration, carbon dioxide concentration, etc.) that is collected in real time from sensors installed in the livestock house.

However, since poor environments, such as gas and dust, in livestock houses, decrease the durability of the installed sensors, causing the sensors to have frequent failures, shortened lifetimes, and data errors, there is difficulty in collecting environment data in a stable manner.

The present invention has been proposed to solve the above-described limitations, and proposes a system and method capable of predicting the remaining lifetime of a sensor installed in a livestock house using the breeding environment of the livestock house and time series-based learning.

According to an embodiment of the present invention, in order to prevent data from being lost due to frequent failures and aging of environmental information collection sensors that are caused by a poor environment of a livestock house, a system and method for predicting the remaining lifetime of a sensor are proposed.

FIG. 1 illustrates data collected by an ammonia measurement sensor.

In FIG. 1, a result of collecting data based on an ammonia measurement sensor for a livestock house, which is located in Suncheon-si, Jeollanam-do, Korea, is illustrated.

The red lines shown in FIG. 1 denote the points in time at which the ammonia concentration measuring sensor has failed.

Although a measurement value of the actual ammonia concentration needs to be maintained between 0 ppm and 100 ppm, gas and dust generated from pigs in the livestock house may frequently cause a failure in which the measurement value of the ammonia concentration is out of an allowable range or the measurement is not performable.

As described above, it is important to stably collect environment data without measurement errors or failures of sensors in a livestock house, and according to the embodiment of the present invention, a system and method for predicting the remaining lifetime of a sensor such that replacement or maintenance is preemptively performed before an error or failure of the sensor to ensure stable collection of data in the livestock are provided.

Figure 2:
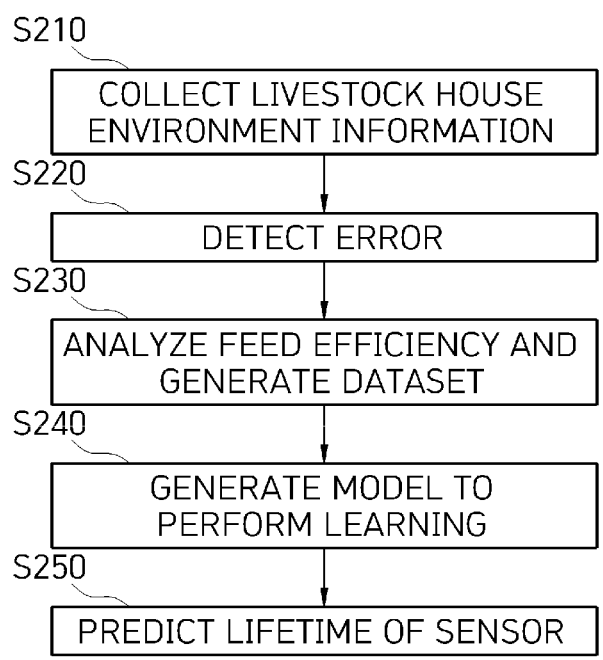
FIG. 2 illustrates a method of predicting the remaining lifetime of an environment data collection sensor in a livestock house according to an embodiment of the present invention.

FIG. 2 illustrates a method of predicting the remaining lifetime of an environment data collection sensor in a livestock house according to an embodiment of the present invention.

The method of predicting the remaining lifetime of an environment data collection sensor in a livestock house according to the embodiment of the present invention includes periodically collecting livestock house environment information (S210), detecting an error on the basis of the collected sensor data (S220), following the detecting of the error, analyzing feed efficiency and generating a dataset for learning (S230), generating a model for predicting a sensor lifetime using the generated dataset and performing learning (S240), and predicting an effective lifetime of the sensor using a result of the learning (S250).

Figure 3:
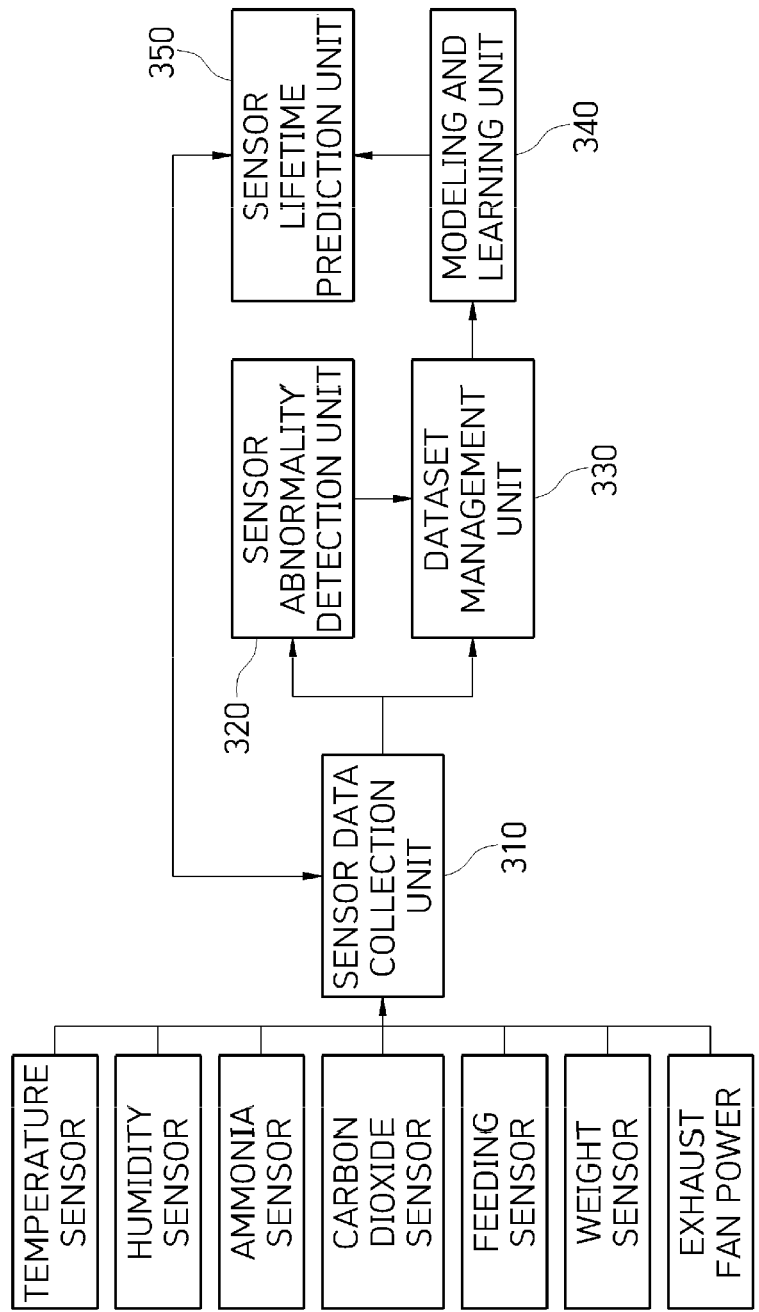
FIG. 3 illustrates a system for predicting the remaining lifetime of an environment data collection sensor in a livestock house according to an embodiment of the present invention.

FIG. 3 illustrates a system for predicting the remaining lifetime of an environment data collection sensor in a livestock house according to an embodiment of the present invention.

A sensor data collection unit 310 periodically collects data from sensors (a temperature sensor, a humidity sensor, an ammonia sensor, a carbon dioxide sensor, a feeding sensor, a weight sensor, etc.) installed inside a livestock house through a wired/wireless communication interface, and stores the collected data in a database.

A sensor abnormality detection unit 320 performs continuous monitoring, for example, of a collected ammonia concentration, identifies whether a malfunction of the ammonia sensor occurs and whether a sensing value is normal, and detects whether an abnormality occurs.

A dataset management unit 330 generates a dataset required for learning using the collected sensor data, and manages the dataset.

A modeling and learning unit 340 generates a time series-based machine learning model to predict the effective lifetime of the ammonia sensor and periodically performs learning using the dataset.

A sensor lifetime prediction unit 350 predicts the effective lifetime of the ammonia sensor using the current sensor data.

The sensor data collection unit 310 collects livestock house environment information, i.e., by collecting information about the temperature, the humidity, the ammonia, the carbon dioxide, the feeding, the weight, and exhaust fan power consumption of the inside of the livestock house as described above.

The temperature, the humidity, the ammonia and the carbon dioxide are key indicators of management of a pig house environment and have a significant impact on feed intake of pigs.

Pigs, which do not have well-developed sweat glands, are less able to radiate metabolic heat generated from the body to the outside of the body compared to other livestock and are sensitive to harmful gas in livestock houses, and in response to a hot and humid climate of July and August in Korea or poor ventilation, pigs may get stressed easily, and have insufficient intake of feed, which significantly restricts the growth of pigs.

The feeding sensor is a sensor that measures the weight of a feed bin of a livestock house and by measuring the amount of initially supplied feed and comparing the measured amount of initially supplied feed with the amount of feed remaining at a measurement time, the amount of feed consumed over a certain period of time may be inferred.

The weight sensor is a sensor that is separately installed in the livestock house to measure weight so that, like the feeding sensor, an increase in weight over a certain period of time may be inferred.

The exhaust fan power sensor is a sensor that measures the power consumed for an exhaust fan operated for ventilation in the livestock house, and the rate at which the exhaust fan is driven may be inferred based on the power consumption.

FIG. 4 illustrates a schema of a database for storing data collected from various sensors installed in a livestock house according to an embodiment of the present invention.

The sensor abnormality detection unit 320 periodically monitors a value collected from a sensor that is subject to lifetime prediction to detect whether there is an abnormality in the sensor.

Figure 5:
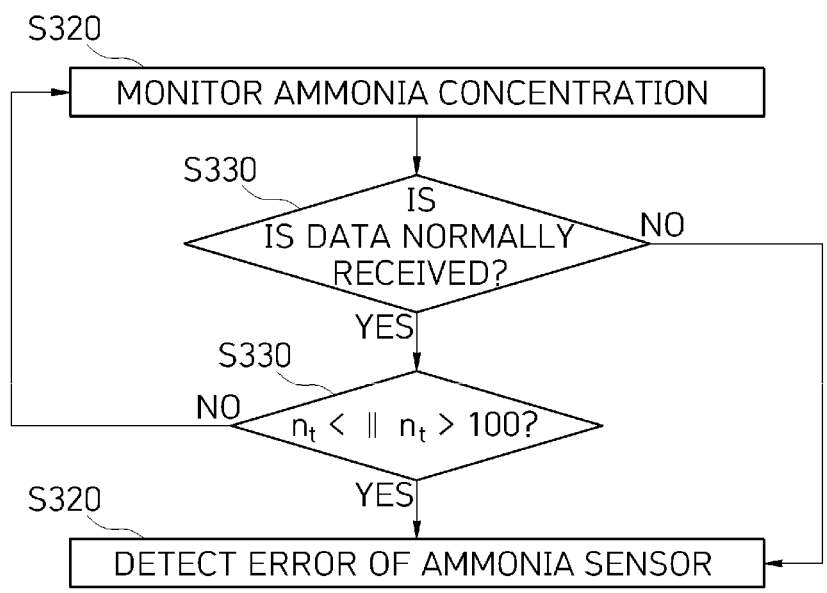
FIG. 5 illustrates a sensor error detection process according to an embodiment of the present invention.

FIG. 5 illustrates a sensor error detection process according to an embodiment of the present invention, in which a process of identifying whether there is an abnormality in a sensor on the basis of ammonia sensor values collected by the sensor abnormality detection unit is illustrated.

When values for ammonia concentration are collected in the database, ammonia concentration monitoring is started (S510).

Whether the value of the ammonia sensor is normally received is identified (S520), and when the value of the ammonia sensor is normally received, whether the collected ammonia concentration is within a generally acceptable range of ammonia concentration values (0 ppm to 100 ppm) is determined (S530).

When determined in operation S530 that the collected ammonia concentration is outside the generally acceptable numerical range of ammonia concentration values, or when identified in operation S520 that data is not normally received, an occurrence of an error in the ammonia sensor is detected (S540).

When an error in the ammonia sensor is detected, the dataset management unit 330 performs a pre-processing process for modeling and learning.

Figure 6:
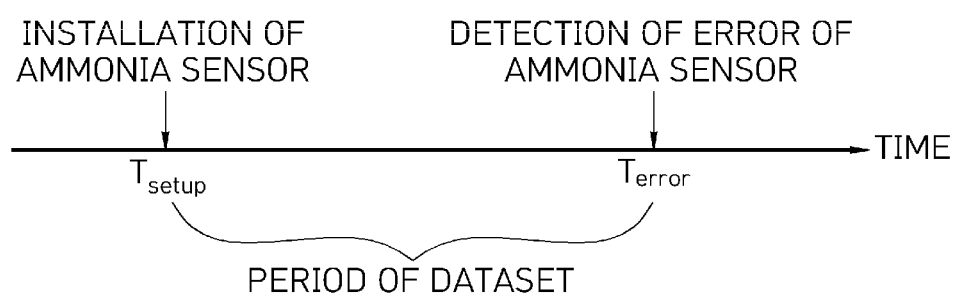
FIG. 6 illustrates a data collection process required for error situation analysis according to an embodiment of the present invention.

The pre-processing process is a process of generating data required to analyze the error situation of the sensor and retrieves information required for the analysis from a collection unit of the database using information about the point in time at which an error of the ammonia sensor is detected since the point in time at which the ammonia sensor is installed as shown in FIG. 6 and uses the retrieved information.

FIG. 7 illustrates a schema regarding a dataset required for learning according to an embodiment of the present invention.

In order to generate the data required for learning, information about the temperature, the humidity, the ammonia, the carbon dioxide, and the exhaust fan power during a period from when the ammonia sensor is installed to when an error is detected is collected, and a database required for learning is generated.

In addition, feed efficiency may be calculated using Equation 1 below using the collected feeding information and weight information.

$$\text{Feed efficiency} = \frac{\text{weight }(T_{error}) - \text{weight }(T_{setup})}{\sum_1^N \text{ feed intake}} \quad \text{[Equation 1]}$$

Feed efficiency refers to the weight that is increased when one livestock animal consumes 1 kg of feed, and is used as an indicator to indirectly evaluate the efficiency of livestock operation by referring to the appropriate recommended efficiency for each stage of pig breeding.

The reason for the feed efficiency being used in the learning dataset is that feed efficiency is an important indicator for the environment of pig growth, since a poor environment of a livestock house causes a rapid decrease in the durability of the ammonia sensor as well as suppression of the growth of pigs due to the environment factors.

It may be inferred that a feed efficiency lower than the recommended feed efficiency for each stage represents inefficient livestock operation in which the feed intake is not efficiently reflected in the weight of the pigs due to environmental factors, while a feed efficiency higher than the recommended feed efficiency represents efficient livestock operation.

A timestamp represents a time on a dataset (assuming the time at which the ammonia sensor is installed as 1) that increases one at a time on each cycle of data collection, and the timestamp is calculated and used based on the period of a dataset.

For example, when the cycle of data collection is one hour, and the ammonia sensor installation time $T_{setup}$ is 2020-01-01 01:00 and the sensor error detection time $T_{error}$ is 2020-01-10 10:00, the total period N corresponding to a dataset is calculated as 225.

The remaining time for each timestamp refers to a value obtained by subtracting the value of the timestamp from the total period N of the dataset, and the remaining time corresponding to the last timestamp N is calculated as 0, that is, the error detection time.

Finally, when the dataset is generated as shown in FIG. 7, the modeling and learning unit 340 trains a sensor lifetime prediction model using a time series-based learning model.

Figure 8:
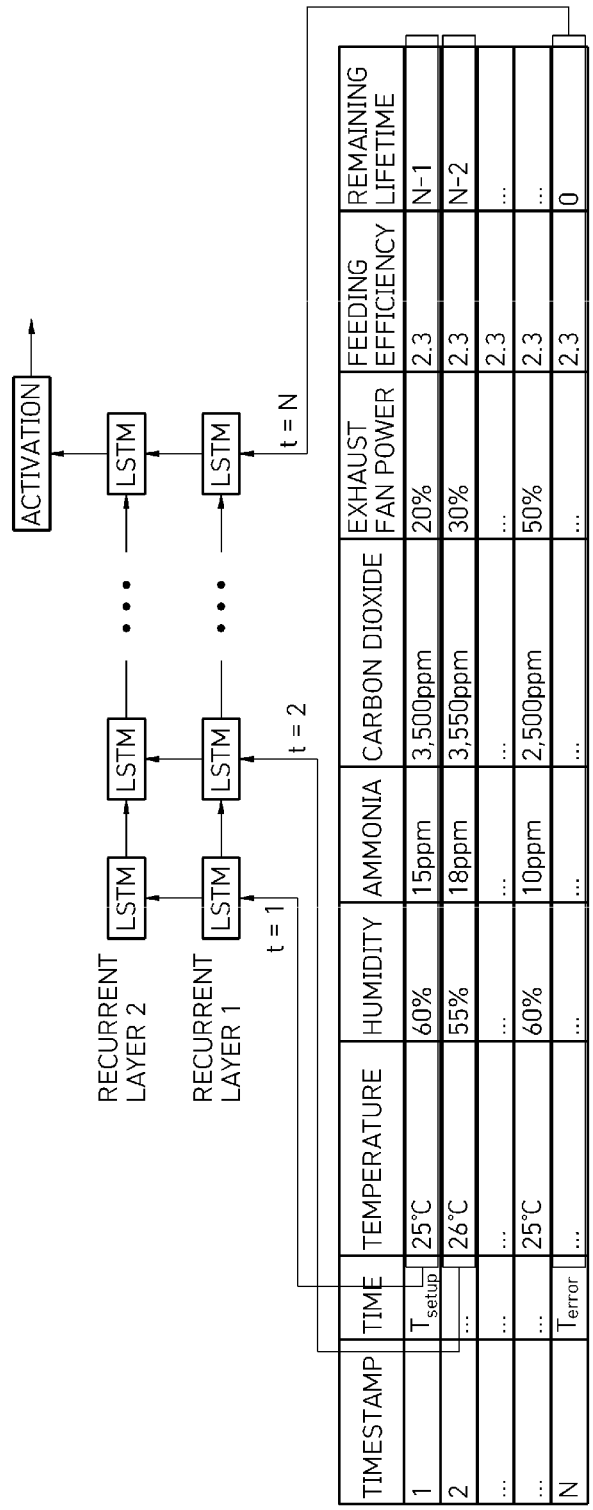
FIG. 8 illustrates a block diagram of a learning model according to an embodiment of the present invention.

FIG. 8 illustrates a block diagram of a model that configures two layers using a recurrent neural network-based long short term memory (LSTM), which is widely used for time series data analysis, defines seven characteristics using a dataset, and performs learning.

Data on seven characteristics (the temperature, the humidity, the ammonia, the carbon dioxide, the exhaust fan power, the feed efficiency, and the remaining lifetime) for each timestamp are sequentially used as inputs to an LSTM cell, and the output is used as an input to the hierarchical LSTM cell and also as an input to a LSTM cell of the next stage.

The modeling and learning unit 340 may perform learning by functions thereof that may be easily implemented for multiple neural networks and corresponding LSTM cells using a LSTM library of TensorFlow which is currently provided as an open source.

Whenever an error of the ammonia sensor is detected, a process of configuring a corresponding dataset for learning and a process of modeling and learning using the configured dataset are repeatedly performed. As the learning process is repeated, the learning model is more likely to become more sophisticated, which ultimately improves the accuracy of predicting the lifetime of the ammonia sensor.

FIG. 9 illustrates a data schema regarding a dataset to be used as an input for predicting the remaining lifetime of an ammonia sensor according to an embodiment of the present invention.

In the case of replacing the existing ammonia sensor having an error with a new ammonia sensor, the maximum lifetime provided by hardware of the sensor may be ensured, but the lifetime of the ammonia sensor gradually decreases due to the poor environment of the livestock house.

Therefore, when predicting the lifetime at a specific point in time $T_{measure}$ after a certain period has elapsed, the prediction may employ a model trained using a dataset from a point in time $T_{setup}$ when the sensor is installed to a current point in time such that the remaining lifetime of the ammonia sensor calculated at the current point in time may be predicted.

Figure 10:
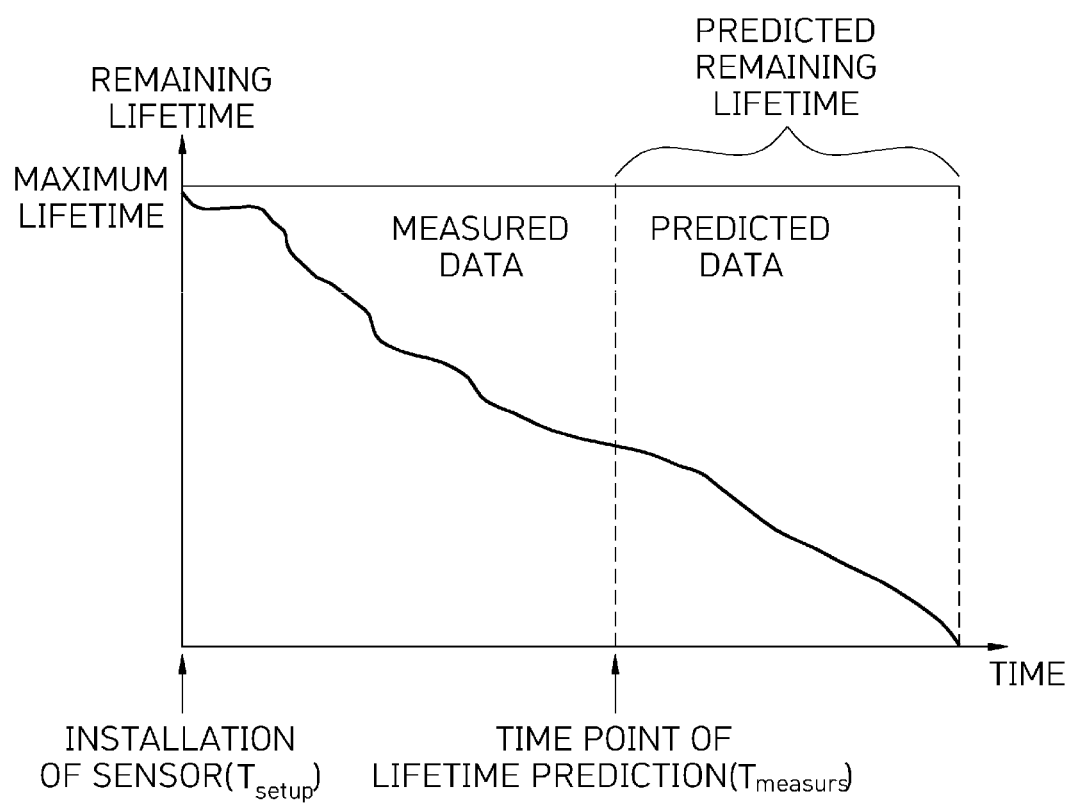
FIG. 10 illustrates a graph showing the prediction of the residual lifetime of an ammonia sensor according to an embodiment of the present invention.

FIG. 10 illustrates a graph showing the prediction of the residual lifetime of an ammonia sensor according to an embodiment of the present invention.

Through an iterative learning process, a model for a sensor lifetime is generated, and the model is employed using the current data as an input so that the remaining lifetime of the ammonia sensor is predicted.

Figure 11:
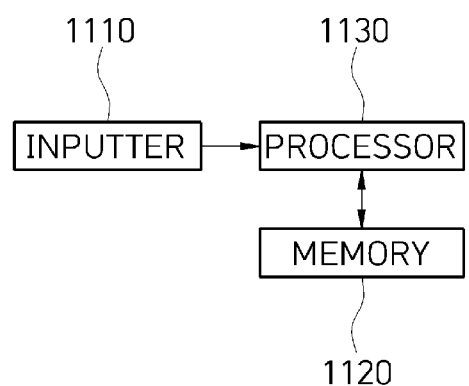
FIG. 11 illustrates an apparatus for predicting the remaining lifetime of an environment data collection sensor in a livestock house according to an embodiment of the present invention.

FIG. 11 illustrates an apparatus for predicting the remaining lifetime of an environment data collection sensor in a livestock house according to an embodiment of the present invention.

The apparatus for predicting the remaining lifetime of an environment data collection sensor in a livestock house according to the embodiment of the present invention includes an inputter 1110 for collecting environmental information of an inside of a livestock house, a memory 1120 in which a program for predicting the remaining lifetime of a sensor using the environment information of the inside of the livestock house is stored, and a processor 1130 for executing the program, and the processor 1130 detects an error of the sensor using the environment information of the inside of the livestock house, generates a dataset for learning, generates a sensor lifetime prediction model to perform learning, and predicts the sensor lifetime using a result of the learning.

The inputter 1110 periodically collects environment information of the inside of the livestock house from a sensor installed inside the livestock house through a wired/wireless communication interface.

The processor 1130 monitors the sensing value to identify whether a malfunction of the sensor occurs and whether the sensing value is normal so as to detect an error in the sensor.

The processor 1130 analyzes feed efficiency over a preset period of time and generates a dataset.

The processor 1130 specifies the characteristics of the environment information of the inside of the livestock house including the temperature, the humidity, the ammonia, the carbon dioxide, the exhaust fan power, the feed efficiency, and the remaining lifetime, and using a time series-based LSTM cell, generates a sensor lifetime prediction model.

The processor 1130 performs a pre-processing process for performing modeling and learning, by retrieving information required for analysis using information about the point in time at which an error in the sensor is detected since the point in time at which the sensor is installed.

Meanwhile, the method of predicting the remaining lifetime of an environment data collection sensor in a livestock house according to an embodiment of the present invention may be implemented in a computer system or may be recorded on a recording medium. The computer system may include at least one processor, a memory, a user input device, a data communication bus, a user output device, and a storage. The above-described components perform data communication through the data communication bus.

The computer system may further include a network interface coupled to a network. The processor may be a central processing unit (CPU) or a semiconductor device for processing instructions stored in the memory and/or storage.

The memory and the storage may include various forms of volatile or nonvolatile media. For example, the memory may include a read only memory (ROM) or a random-access memory (RAM).

Accordingly, the method of predicting the remaining lifetime of an environment data collection sensor in a livestock house according to an embodiment of the present invention may be implemented in a computer-executable form. When the method of predicting the remaining lifetime of an environment data collection sensor in a livestock house according to the embodiment of the present invention is performed by the computer, instructions readable by the computer may perform the method of predicting the remaining lifetime of an environment data collection sensor in a livestock house according to the embodiment of the present invention.

As is apparent from the above, the apparatus and method according to the present invention can predict the remaining lifetime of a sensor in a livestock house so that a preemptive response is taken before an error or failure of the sensor occurs to prevent livestock house environment data from being lost, and the environment data is collected in a stable manner and used for management of specifications of the livestock house in various uses.

The effects of the present invention are not limited to those described above, and other effects not described above will be clearly understood by those skilled in the art from the above detailed description.

Meanwhile, the method of predicting the remaining lifetime of an environment data collection sensor in a livestock house according to an embodiment of the present invention may be embodied as computer readable code on a computer-readable recording medium. The computer-readable recording medium is any recording medium that can store data that can be read by a computer system. Examples of the computer-readable recording medium include a ROM, a RAM, a magnetic tape, a magnetic disk, a flash memory, an optical data storage, and the like. In addition, the computer-readable recording medium may be distributed over network-connected computer systems so that computer readable code may be stored and executed in a distributed manner.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method of predicting a remaining lifetime of an environment data collection sensor installed within a livestock house, the method comprising:
   collecting livestock house environment information from a sensor through a wired/wireless communication interface;
   storing the collected livestock house environment information in a database;

detecting an error of the sensor from the collected livestock house environment information;
generating a dataset for learning based on given livestock house environment information collected during a period from a time of sensor installation up to a time of detecting the error, the given livestock house environment information being obtained from the collected livestock house environment information stored in the database;
generating a sensor lifetime prediction model to perform the learning, the sensor lifetime prediction model being a time series-based machine learning model;
training the sensor lifetime prediction model using the dataset; and
predicting a remaining lifetime of the sensor at a specific time point by applying a dataset, which is acquired from livestock house environment information collected at the specific time, to the trained sensor lifetime prediction model.

2. The method of claim 1, wherein the detecting an error includes monitoring the livestock house environment information to identify whether a malfunction of the sensor occurs or whether a sensing value of the sensor is normal so as to detect the error.

3. The method of claim 1, wherein the generating a dataset further includes analyzing feed efficiency over a preset period of time and generating the dataset.

4. The method of claim 1, wherein the generating the sensor lifetime prediction model includes: specifying characteristics of the livestock house environment information including information about a temperature, a humidity, ammonia, carbon dioxide, exhaust fan power, feed efficiency, and a remaining lifetime; and generating the sensor lifetime prediction model using a time series-based long short term memory (LSTM) cell.

5. An apparatus for predicting a remaining lifetime of an environment data collection sensor installed within a livestock house, the apparatus comprising:
a memory in which a program for predicting a remaining lifetime of a sensor using the environment information of the livestock house is stored; and
a processor configured to execute the program,
wherein the processor is configured to,
collecting the livestock house environment information from a sensor through a wired/wireless communication interface;
storing the collected livestock house environment information in a database;
detecting an error of the sensor from the collected livestock house environment information;
generating a dataset for learning based on given livestock house environment information collected during a period from a time of sensor installation up to a time of detecting the error, the given livestock house environment information being obtained from the collected livestock house environment information stored in the database;
generating a sensor lifetime prediction model to perform the learning, the sensor lifetime prediction model being a time series-based machine learning model;
training the sensor lifetime prediction model using the dataset, and
predicting a remaining lifetime of the sensor at a specific time point by applying a dataset, which is acquired from livestock house environment information collected at the specific time, to the trained sensor lifetime prediction model.

6. The apparatus of claim 5, wherein the livestock house environment information is periodically collected from the sensor installed in the livestock house through a wired/wireless communication interface.

7. The apparatus of claim 5, wherein the processor is configured to monitor a sensing value to identify whether a malfunction of the sensor occurs or whether the sensing value is normal so that the error is detected.

8. The apparatus of claim 5, wherein the processor is configured to analyze feed efficiency over a preset period of time and generate the dataset.

9. The apparatus of claim 5, wherein the processor is configured to specify characteristics of the livestock house environment information including information about a temperature, a humidity, ammonia, carbon dioxide, exhaust fan power, feed efficiency, and a remaining lifetime, and generate the sensor lifetime prediction model using a time series-based long short term memory (LSTM) cell.

* * * * *